US007412697B2

(12) United States Patent
Moore et al.

(10) Patent No.: US 7,412,697 B2
(45) Date of Patent: Aug. 12, 2008

(54) HIGH-LEVEL LANGUAGE, ARCHITECTURE-INDEPENDENT PROBE PROGRAM COMPILER

(75) Inventors: Richard J. Moore, Waterlooville (GB); Thomas R. Zanussi, Evanston, IL (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 10/603,700

(22) Filed: Jun. 25, 2003

(65) Prior Publication Data

US 2004/0268325 A1 Dec. 30, 2004

(51) Int. Cl.
*G06F 9/45* (2006.01)

(52) U.S. Cl. .................. 717/144; 717/129; 717/140; 717/143

(58) Field of Classification Search ........... 717/124, 717/127–130, 140–144
See application file for complete search history.

(56) References Cited

U.S. PATENT DOCUMENTS

| | | | | |
|---|---|---|---|---|
| 5,901,315 | A * | 5/1999 | Edwards et al. | 717/124 |
| 6,186,677 | B1 * | 2/2001 | Angel et al. | 717/118 |
| 6,253,370 | B1 * | 6/2001 | Abadi et al. | 717/154 |
| 6,314,558 | B1 * | 11/2001 | Angel et al. | 717/118 |
| 6,493,868 | B1 * | 12/2002 | DaSilva et al. | 717/105 |
| 6,738,967 | B1 * | 5/2004 | Radigan | 717/146 |
| 6,748,588 | B1 * | 6/2004 | Fraser et al. | 717/146 |
| 6,760,903 | B1 * | 7/2004 | Morshed et al. | 717/130 |
| 6,795,963 | B1 * | 9/2004 | Andersen et al. | 717/130 |

(Continued)

OTHER PUBLICATIONS

Definition of Abstract syntax tree- retrieved from google.com on Nov. 21, 2006.*
Lourenco, J., Cunha, J., Krawczyk, H., Kuzora, P., Neyman, M., & Wiszniewski, B.. "An integrated testing and debugging environment for parallel anddistributed programs." EUROMICRO 97. 'New Frontiers of Information Technology'., Proceedings of the 23rd EUROMICRO Conference 23(1997): 291-298.*
DeRose, L. Hoover T. Hollingstworth, J.. "The dynamic probe class library-an infrastructure for developinginstrumentation for performance tools." Parallel and Distributed Processing Symposium., Proceedings 15th International 12(2001): 7.*
"Creating Native Methods," Java Developer's Guide, chapter 38, accessed from Internet web site http://www.webbasedprogramming.com/JAVA-Developers-Guide/ch38.htm on Aug. 30, 2007.

*Primary Examiner*—Wei Y. Zhen
*Assistant Examiner*—Matthew J Brophy
(74) *Attorney, Agent, or Firm*—Abdy Raissinia

(57) ABSTRACT

A high-level language, architecture-independent probe program compiler is disclosed. A base program is executable by one or processors, and has one or more breakpoints. A probe program is associated with each breakpoint and is also indirectly executable by the one or more processors. The probe program is independent of the architecture of the processors, and is generated from source code written in a high-level language. The probe program associated with each breakpoint is executed when the breakpoint is reached during execution of the base program. The compiler may employ an abstract syntax tree to switch between an address space of the probe program and an address space of the base program, by traversing the tree. Some of the nodes of the tree may more simply represent address space-specific objects of the base program. The probe program may be able to pass messages by manipulating the state of the base program.

1 Claim, 5 Drawing Sheets

U.S. PATENT DOCUMENTS

| | | | |
|---|---|---|---|
| 6,928,449 B2 * | 8/2005 | Ten-Hove et al. | 707/102 |
| 6,968,540 B2 * | 11/2005 | Beck et al. | 717/130 |
| 6,986,124 B1 * | 1/2006 | Field et al. | 717/124 |
| 7,028,290 B2 * | 4/2006 | Srivastava et al. | 717/124 |
| 7,134,115 B2 * | 11/2006 | Kawai et al. | 717/124 |
| 7,293,259 B1 * | 11/2007 | Dmitriev | 717/130 |
| 7,293,260 B1 * | 11/2007 | Dmitriev | 717/130 |
| 7,293,261 B1 * | 11/2007 | Anderson et al. | 717/136 |
| 2002/0144245 A1 * | 10/2002 | Lueh | 717/140 |
| 2004/0172623 A1 * | 9/2004 | Eckels et al. | 717/125 |
| 2004/0255278 A1 * | 12/2004 | Bates et al. | 717/129 |

* cited by examiner

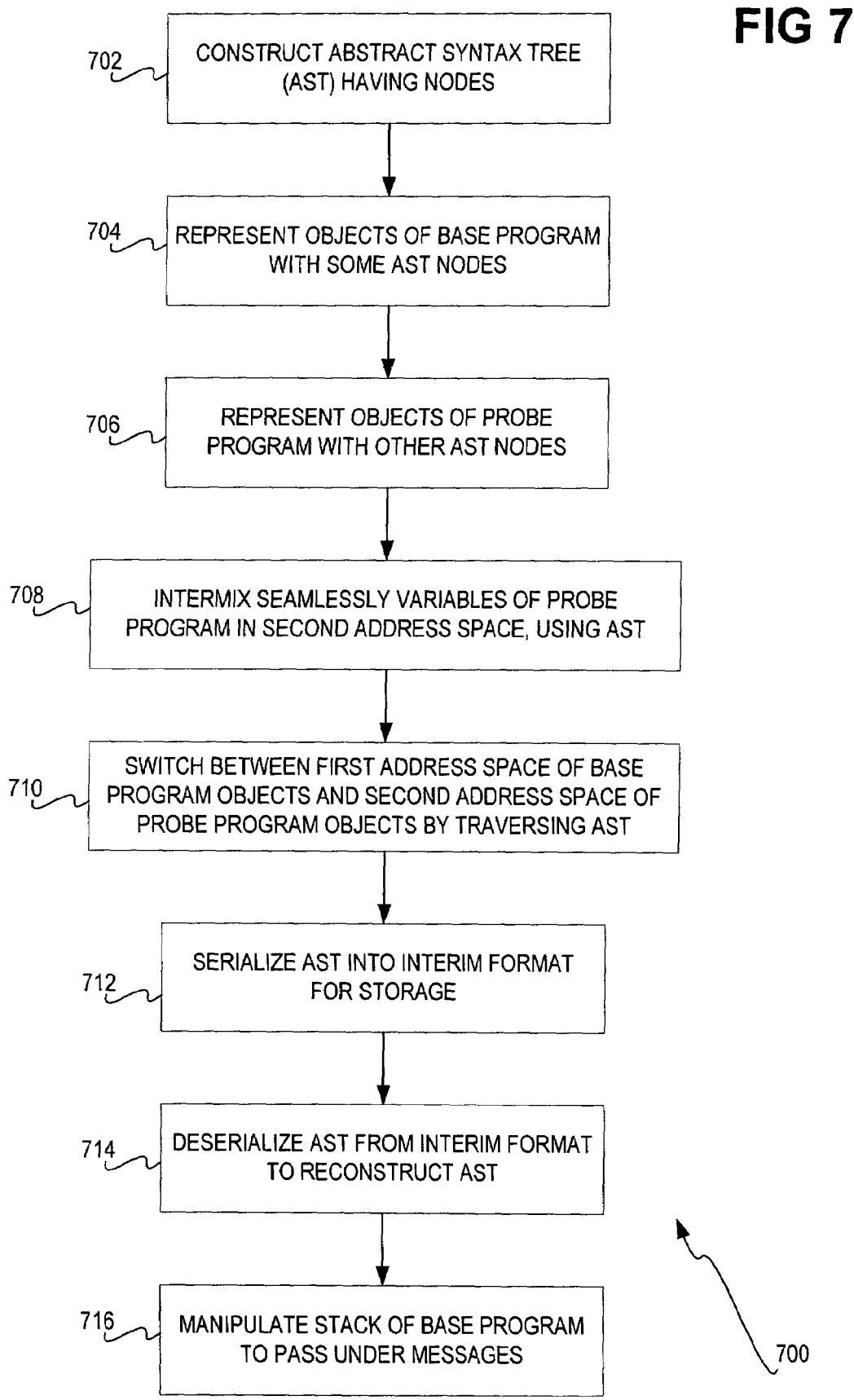

HIGH-LEVEL LANGUAGE, ARCHITECTURE-INDEPENDENT PROBE PROGRAM COMPILER

BACKGROUND OF THE INVENTION

1. Technical Field

This invention relates generally to probe programs that are associated with breakpoints within base, or probed, programs, and more particularly such probe programs that are written in high-level languages and that are independent of processor architectures.

2. Description of the Prior Art

As computer programs have become more complex, the chance that bugs, or errors, will occur during their development is high. The process of finding bugs in computer programs and correcting them is referred to as debugging. One type of debugging tool that is used is known as the probe program. Breakpoints are set at various locations within a program to be probed, which is known as the base, or probed, program. A probe program associated with a given breakpoint is executed when the breakpoint is reached during test execution of the base program. That is, the probe program is executed when the corresponding probe is fired during test execution of the base program. This enables the developer to diagnose various parts of the base program, and look for and correct any bugs within the base program.

A probe program typically provides the developer with access to the lowest-level resources of the system on which the base program is running. Therefore, the probe program is usually dependent on the architecture of the processor of the system, and the machine code representation of the probed program. That is, the probe program is usually dependent on the high-level language in which the probed program itself is written, and/or the address space in which the probed program operates. Probe programs act as if they were small sections of code logically inserted into the interior of the code of the base, or probed, program itself. The dependency of the probe program on the processor's architecture, and the base program's machine code representation, can limit the usability of the probe program, however.

For example, the probe program may have to be rewritten for every type of processor architecture in which the probe program is to be utilized. This can consume resources that otherwise could be dedicated to developing the base program. A probe program written for one type of processor architecture may not be suitable for another type of processor architecture, limiting its transportability across architectures. Furthermore, when the machine code representation of the base program changes, due to the base program being compiled for a different processor instruction set, for instance, the previously employed probe program may no longer be functional for the new processor instruction set. This also limits the usefulness of the probe program. For these and other reasons, therefore, there is a need for the present invention.

SUMMARY OF THE INVENTION

The invention relates to a high-level language, architecture-independent probe program compiler. A system of the invention includes one or more processors, a base program, and a probe program. The base program is executable by one or more processors, and has one or more breakpoints. A probe program is associated with each breakpoint and is executable by an interpreter running on one or more processors. The probe program associated with each breakpoint is executed when the breakpoint is reached during execution of the base program.

A method of the invention is for constructing a probe program associated with a breakpoint of a base program. An abstract syntax tree (AST) having a number of nodes is constructed. Objects of the base program are represented by at least some of the nodes of the AST, whereas objects of the probe program are represented by other nodes of the AST. Traversing the AST allows for switching between a first address space of the objects of the base program and a second address space of the objects of the probe program.

An article of manufacture of the invention includes a machine-readable medium and means in the medium. The means is for probing a base program at a breakpoint thereof in a processor architecture-independent manner. Other features and advantages of the invention will become apparent from the following detailed description of the presently preferred embodiment of the invention, taken in conjunction with the accompanying drawings.

BRIEF DESCRIPTION OF THE DRAWINGS

FIG. 7 is a method for constructing and using a probe program associated with a breakpoint of a base program, according to an embodiment of the invention.

DESCRIPTION OF THE PREFERRED EMBODIMENT

System Probe Program and Base Program

Figure 1:
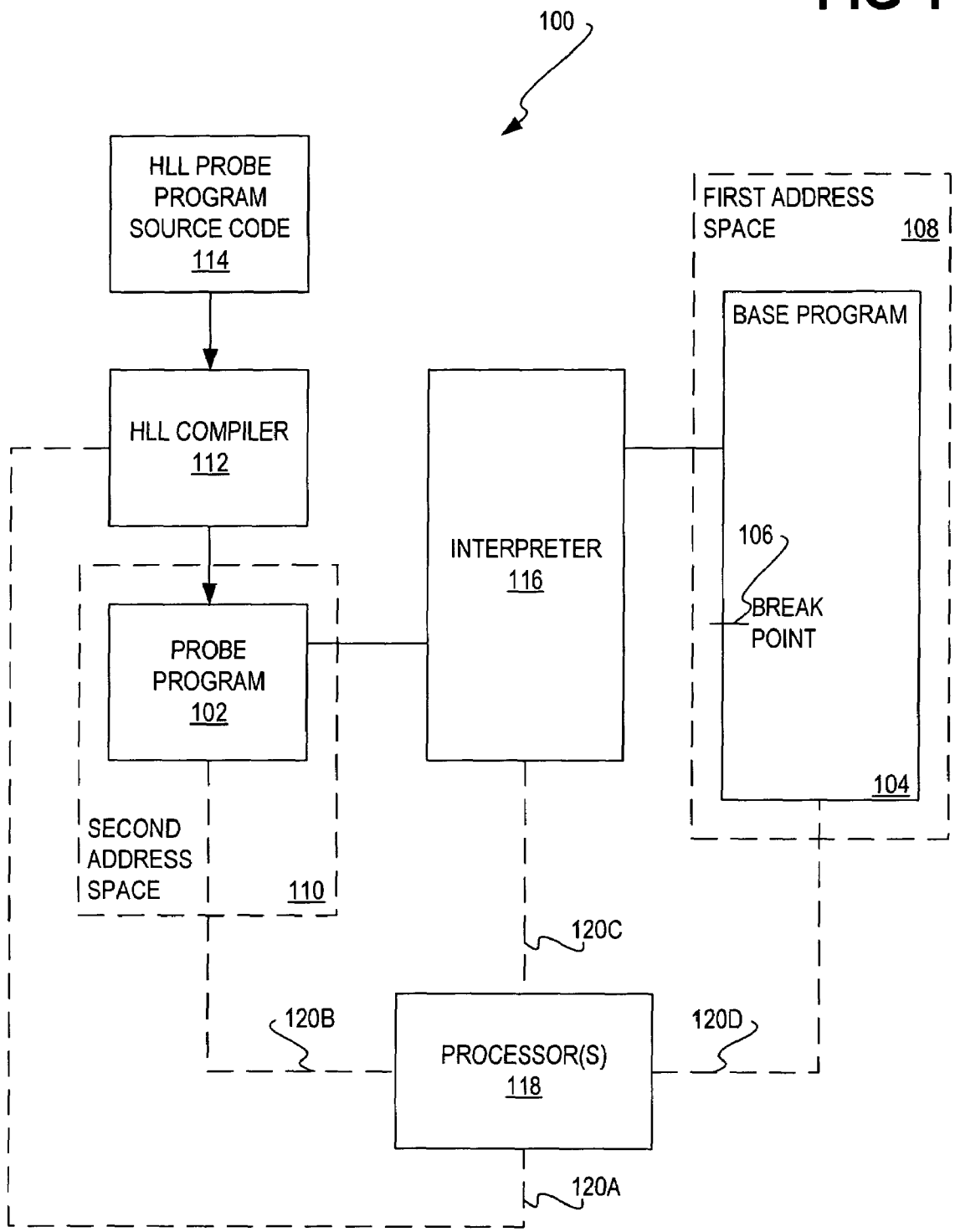
FIG. 1 is a diagram of a system that includes a probe program and a base, or probed, program, according to an embodiment of the invention, and is suggested for printing on the first page of the patent.

FIG. 1 shows a system 100, according to a preferred embodiment of the invention. The system 100 includes a probe program 102 and a base, or probed, program 104. The probe program 102 is associated with a breakpoint, or probe, 106 of the base program 104. Therefore, the probe program 102 is a diagnostic or debugging tool that is executed when the breakpoint 106 is reached during the execution of the base program 104. Although only one probe program 102, associated with a single breakpoint 106, is depicted in FIG. 1, there may be more than one probe program, correspondingly associated with more than one breakpoint within the base program 104. The probe program 102 and the base program 104 can in one embodiment be implemented as means in a machine-readable medium performing their respective functionality. The machine-readable medium may be a modulated carrier signal, a recordable data storage medium, or another type of medium, and may be part of an article of manufacture, as can be appreciated by those of ordinary skill within the art.

The probe program 102 is written in a high-level language (HLL), such as a variant of the C programming language, or another type of programming language. The probe program 102 is thus initially written as the HLL probe program source code 114. A HLL compiler 112 preferably specifically intended for compiling probe program source code into probe programs compiles the HLL probe program source code 114 into the executable probe program 102. The HLL in which the probe program 102 is written may be the same or different than the HLL in which the base program 104 is written. This is because the HLL compiler 112 is preferably specifically employed for compiling the probe program 102, and not necessarily for compiling the base program 104.

The base program 106 is executed within a first address space 108, whereas the probe program 102 is executed within a second address space 110. An interpreter 116 is utilized in debugging the base program 104. When the breakpoint 106 is reached during execution of the base program 104, the interpreter 116 executes the probe program 102.

The HLL compiler 112, the probe program 102, the interpreter 116, and the base program 104 are all technically executed by the processor(s) 118, as indicated by the dotted lines 120A, 120B, 120C, and 120D, respectively, which are collectively referred to as the dotted lines 120. For instance, the interpreter 116 runs on the processor(s) 118, and causes the probe program 102 to be executed by the processor(s) 118. The processor that executes the probe program 102 may be the same or different than the processor that executes the base program 104. The probe program 102 is independent of the architecture of the processor(s) 118, because it is initially written as the HLL probe program source code 114, and compiled for a particular architecture of the processor(s) 118 by the HLL compiler 112. The probe program 102 is independent of the machine code representation of the base program 104, which is tied to the instruction set of the processor(s) 118, by employing a suitable HLL compiler 112.

Figure 2:
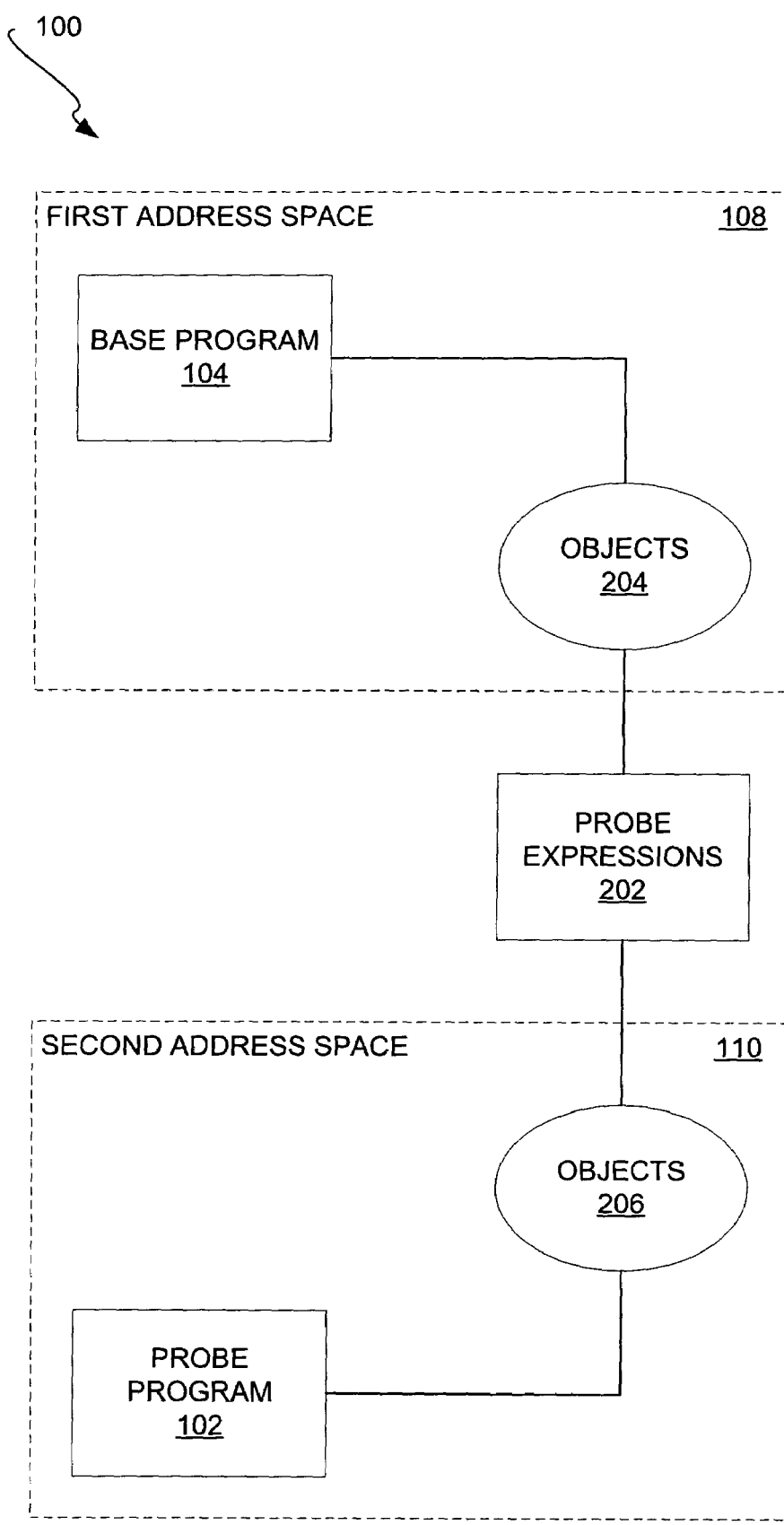
FIG. 2 is a diagram of another view of the system of FIG. 1, in which probe expressions between objects of the address space of the base program and objects of the address space of the probe program are illustrated, according to an embodiment of the invention.

FIG. 2 shows another view of the system 100 of FIG. 1, according to an embodiment of the invention. The base program 104 has software objects 204 within its first address space 108, whereas the probe program 102 has software objects 206 within its second address space 110. Software objects can be defined as encapsulated code sections, or encapsulated variables, that are typically employed within an object-oriented programming (OOP) environment.

Probe expressions 202 effectively interface the objects 204 of the first address space 108 with the objects 206 of the second address space 110. The probe expressions 202 thus address the objects 204 of the first address space 108, and are used by the objects 206 of the second address space 210, to enable the objects 206, and the probe program 102, to communicate with the objects 204. The probe expressions 202 more specifically refer to expressions that are written in the HLL of the base program 104, and which when compiled generate code that addresses the objects 204 within the first address space 108 so that the probe program 102 and the objects 206 within the second address space 110 can access the objects 204.

Abstract Syntax Trees (AST's)

The high-level language (HLL) compiler 112 uses a common set of code and data structures to represent and manipulate the elements of the parsed HLL probe program 102 and the probe target expressions 202, in the form of an abstract syntax tree (AST) and AST processing and traversal functions. An AST is a type of parse tree, which itself has nodes that are labeled with production variable names, and leaves that represent the terminals of a programming grammar. The names of the non-terminals of the grammar decorate the edges of a parse tree. Parsing is the process of translating a sequence of instructions into a parse tree. An AST is more specifically a pared-down parse tree, in which each node is an element of a programming language. The non-leaf nodes represent operators while the leaf nodes represent operands. Once the HLL compiler 112 constructs an AST, all later phases of the compiler 112 work on the AST, and not on the source code 114 of the probe program 102.

Figure 3:
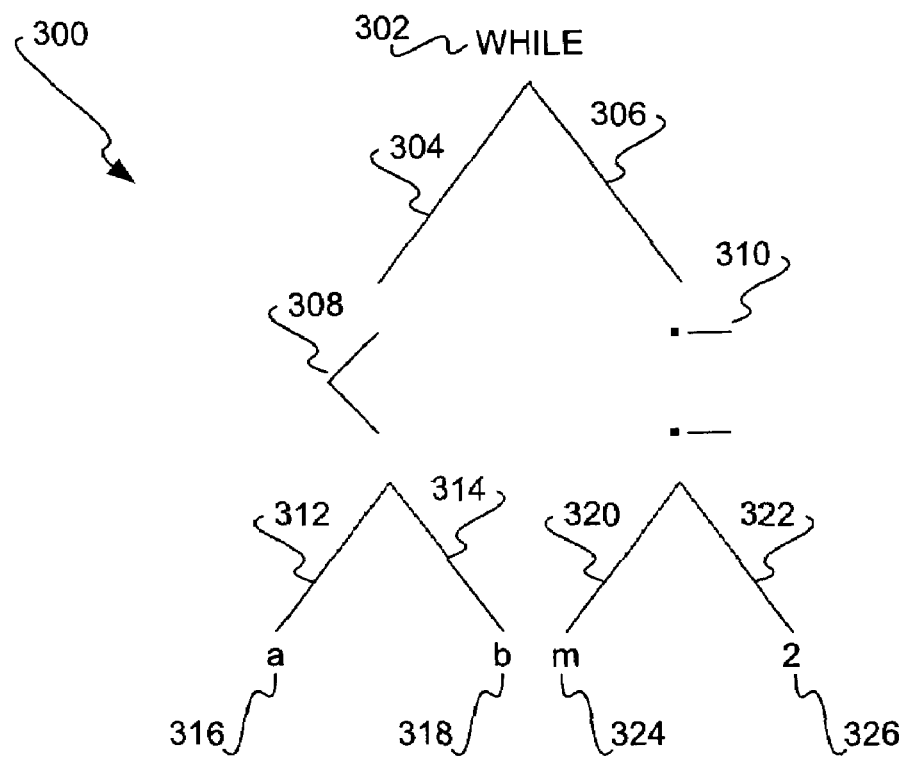
FIG. 3 is a diagram of a rudimentary example abstract syntax tree (AST), such as that in conjunction with which embodiments of the invention may be implemented.

FIG. 3 shows a rudimentary example AST 300, such as that in conjunction with which embodiments of the invention may be practiced. The AST 300 is for the instruction sequence WHILE (a<b)m=2. The nodes 302, 308, and 310 of the AST 300 are non-leaf nodes, and represent the operators WHILE, <, and :=, respectively. The nodes 316, 318, 324, and 326 of the AST 300 are leaf nodes, and represent the operands a, b, m, and 2, respectively. The branches 304 and 306 denote the relationship between the operator WHILE of the node 302 and the operators < and := of the nodes 308 and 310, respectively. The branches 312 and 314 denote the relationship between the operator < of the node 308 and the operands a and b of the nodes 316 and 318, respectively. The branches 320 and 322 denote the relationship between the operator := of the node 310 and the operands m and 2 of the nodes 324 and 326, respectively. The AST 300 may be interpreted as (WHILE (<(a b)):=(m 2))) in a reverse polish notation (RPN) of the instruction sequence WHILE (a<b)m=2.

Figure 4:
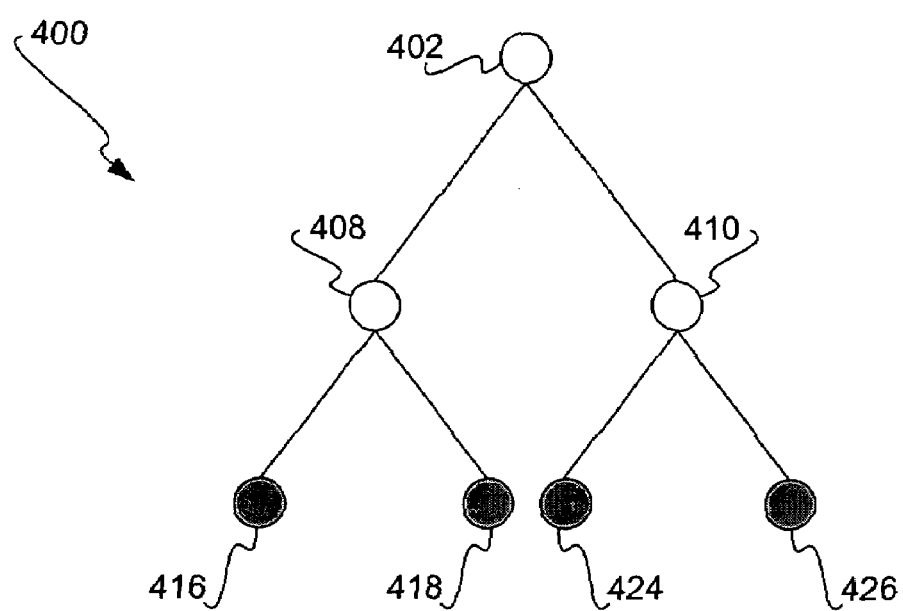
FIG. 4 is a diagram of another rudimentary example AST, such as that in conjunction with which embodiments of the invention may be implemented, which is more generic than the AST of FIG. 3.

FIG. 4 shows a rudimentary example AST 400, such as that in conjunction with which embodiments of the invention may be practiced, that is more generic than the AST 300 of FIG. 3. The AST 400 has non-leaf operator nodes 402, 408, and 410, which are non-shaded in FIG. 4, and leaf operand nodes 416, 418, 424, and 426, which are shaded in FIG. 4. In the context of the HLL compiler 112, the operands may represent the objects 206 of the probe program 102, as well as the objects 204 of the base program 104, the latter insofar as they are represented by or interfaced with the probe expressions 202.

The probe expressions 202 thus more simply represent the complex first address space-specific objects 204 of the base program 104, and are represented by some of the operand nodes 416, 418, 424, and 426 of the same AST 400 that is used to parse the second space-specific objects 206 of the probe program 102. That is, the AST 400 includes both nodes directed to the first address space 108 and nodes directed to the second address space 110. Traversing the AST 400 therefore enables the HLL compiler 112 and the probe program 102 to switch between the base program 104 and the probe program 102 as needed.

Once the probe program 102 and/or the probe expressions 202 are in the AST form, the HLL compiler 112 makes use of common AST processing functions to perform typechecking, and to generate code. Some of the processing that is done depends on what the applicable address space context is of the probe program 102 and/or of the probe expressions 202. For this purpose, a set of function pointers, one for each address space context-specific function, is registered by each context and is subsequently used to switch the context-specific functionality as a group, whenever the address space context changes.

The address space context of the probe expressions 202 of one embodiment of the HLL compiler 112 may make direct use of GNU debugger (gdb) data structures, and gdb and other library code that access and manipulate these data structures, as known to those of ordinary skill within the art. These may include objects, such as symbols and data types, which contain a large amount of information and complexity related to the fact that they describe actual computer programs, as well as a host of complex code needed to access and manipulate the objects. Such objects are mapped to a much simpler representation of equivalent objects within the HLL compiler 112, and are represented as simple nodes within the AST of the probe program 102 and/or the probe expressions 202. This is accomplished by attaching opaque handles representing the gdb objects to the nodes of the AST, as well as caching frequently accessed values from the real objects in the corresponding fields of the AST nodes.

Virtual function implementations of the probe expressions 202 may thus use these opaque handles and the external gdb and other functions to provide the information expected by the AST. As a result, significant complexity is hidden behind the relatively simple AST data structures and functions. This scheme may be considered as a proxy design pattern, in which a surrogate or a placeholder for another object controls access to it. The scheme may also be described as a bridge design pattern, in which an abstraction is decoupled from its implementation so that they two can vary independently.

Preferably, the AST corresponding to the probe program 102 and/or the probe expressions 202 can be serialized into an interim format, and deserialized from the interim format to reconstruct the AST. The interim format of the AST may be saved to persistent storage, or transmitted to another program and subsequently deserialized. This enables the AST to be portable, such that it may be generated by different front ends, or parsers, or that could be used by alternative back ends to generate code. As can be appreciated by those of ordinary skill within the art, serialization is accomplished by recursively traversing the AST, and at each node writing the minimum amount of information necessary to later reverse the process by reading the serialized data and recreating the original AST.

For parts of the AST corresponding to objects within the second address space 110 of the probe program 102, the literal serialized data itself is sufficient to recreate the corresponding portions of the AST tree. For sub-trees of the AST that correspond to the probe expressions 202, the information needed to create the sub-tree is contained elsewhere, as part of the base program 104, for instance, or in executables containing debugging information. Therefore, these sub-trees of the AST are annotated with all the information needed for deserialization to retrieve the additional data needed to fully recreate the original AST.

The AST of the probe program 102 and the probe expressions 202 also enable the HLL compiler 112 to seamlessly intermix variables of the base program 104 of the first address space 108, through the probe expressions 202, and variables of the probe program 102 of the second address space 110. The result of evaluating the probe expressions 202, which are expressions within the context of the address space 108 of the base program 104, can thus be assigned to a variable within the address space 110 of the probe program 102, as interpreted by the interpreter 116, for instance. If the result of a probe expression is an address within the base program 104, and it is assigned to a pointer variable within the probe program 102, subsequent operations on the pointer variable apply to the first address space 108 of the base program 104, rather than to the second address space 110 of the probe program 102. The HLL compiler 112 associates the source of a variable with the variable and generates code affecting that variable within the context of the source address space.

For instance, different probe variables may exist in independent and unconnected storage areas. The HLL compiler 112 fetches and assigns these variables using different instructions. Such independent and unconnected storage areas include local variables, global variables, stacks, and heaps, where each of these has its own address space accessible by instructions reserved for use with each type of address. To accomplish uniform representations of pointer variables in the HLL in which the probe program 102 is originally written, such variables carry additional information at run-time specifying their source. This enables the correct access and assignment instructions to be selected at run-time.

Furthermore, even if a probe expression of the probe expressions 202 is not assigned to a variable, it is used as an lvalue, as is known to those of ordinary skill within the art, the HLL compiler 112 generates code relative to the address space of the lvalue. If a pointer variable or probe expression result points to executable instruction, such as a function pointer, then function calls via that function pointer likewise apply to the source address space. That is, a function call made via a pointer to a function address within the base program 104 results in a call to the function of the base program 104 within the address space 108.

Passing Messages by Stack, or State, of Base Program

The probe program 102, like nearly all computer programs, employs a stack. A stack is generally a set of hardware registers or a reserved amount of memory used for arithmetic calculations or to keep track of internal operations. Stacks keep track of the sequence of routines called in a program. For example, one routine calls another, which calls another and so on. As each routine is completed, the processor(s) 118 return control to the calling routine all the way back to the first one that started the sequence. Stacks used in this way are last-in, first-out (LIFO) stacks in which the last item, or address, placed or pushed onto the stack is the first item removed or popped from the stack. Stacks are also used to hold interrupts until they can be serviced. Used in this manner, they are first-in, first-out (FIFO) stacks, in which the first item onto the stack is the first item out of the stack.

Figure 5:
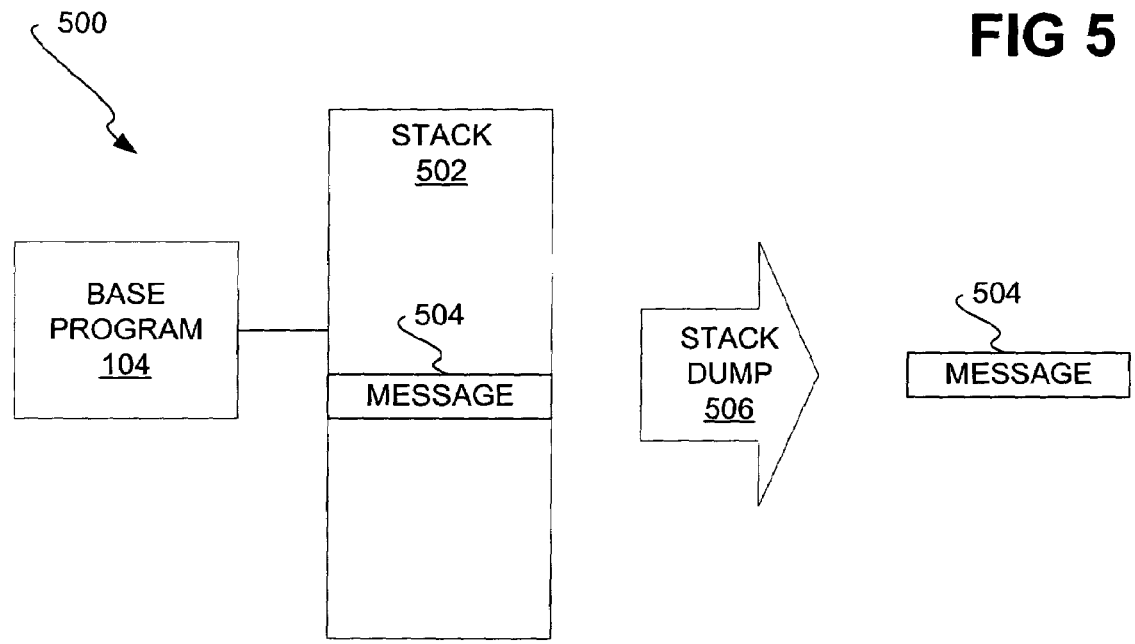
FIG. 5 is a diagram of a scenario in which the stack of a computer program is manipulated to pass a message to an end user, according to an embodiment of the invention.

FIG. 5 shows a scenario 500 in which the stack 502 of the probe program 102 is used to convey a message 504 to a user, such as the developer of the probe program 102, according to an embodiment of the invention. The probe program 102 or the HLL compiler 112 manipulates the stack 502 to insert the message 504 within the stack 502. When a stack dump occurs, as indicated by the arrow 506, the message 504 is then explicated from the stack 502 and is viewable by the user. This mechanism can also be applied to the base program 104. The base program 104's stack, or state, can be manipulated to contain a message. The stack 502 may then be intentionally dumped by forcing the base program 104 to crash, or by forcing the base program 104 to encounter an error, for instance.

In this way, a standard logging mechanism in the form of a stack dump is used to provide useful human-readable real-time probe debugging information. A computer program, such as one written in the Perl programming language or another programming language, is used to tail the system log and filter out irrelevant data, such that the part of the stack dump that remains is the useful information contained in the message 504. The stack 502 is manipulated such that when a relevant instruction is executed, the data output to the log from the stack 502 is in the desired format to convey a useful message to the user. That is, the stack 502 is reverse-engineered into a desired state before causing the state capture to occur.

Figure 6:
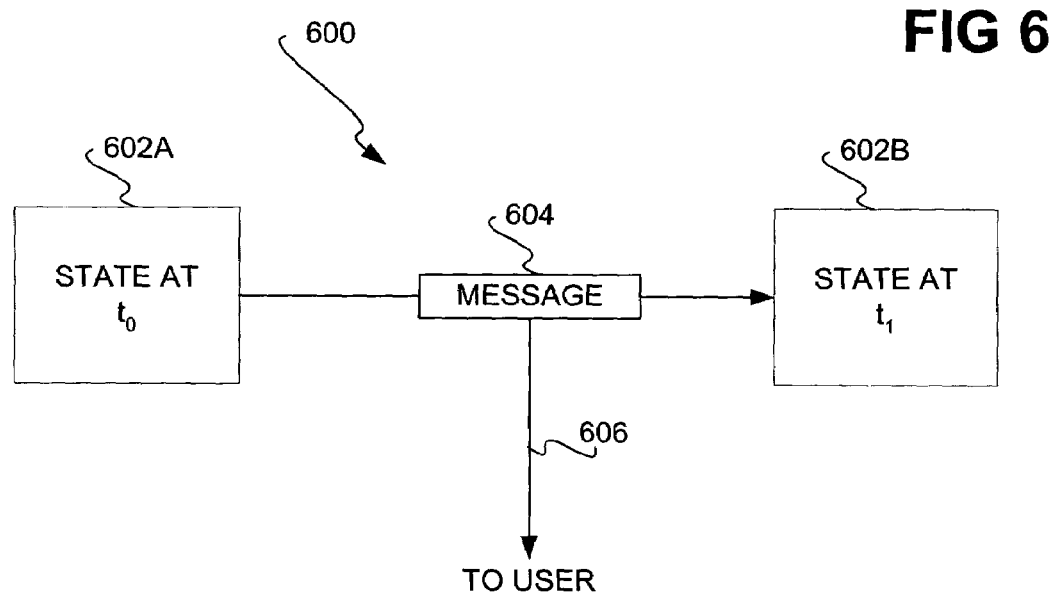
FIG. 6 is a diagram of a scenario that is more generic than the scenario of FIG. 5, in which the state of an entity is manipulated to pass a message to an end user, according to an embodiment of the invention.

FIG. 6 shows a scenario 600 in which states 602A and 602B are used to convey a message 604, according to an embodiment of the invention. The scenario 600 is a more generalized version of the scenario 500 of FIG. 5. In particular, the transition from the state 602A at time $t_0$ to the state 602B at time $t_1$ itself causes the message 604 to be passed to the user, as indicated by the arrow 606. The states 602A and 602B may be the states of the stack 502, for instance, before and after the message 504 was inserted into the stack 502 and the stack 502 was dumped. The states 602A and 602B may also be the states of a different entity, such as an object, a variable, a program, and so on.

The state of an object is thus reverse-engineered in order to convey a message that the object was not intended to convey. The state of any computer program may conceivably be reverse-manipulated such that its state reflects a message unrelated to the intended purpose of the program. For instance, manipulating the state of the computer program and intentionally crashing it allows a core dump of the program to be the vehicle for a given message. It is therefore possible, for example, for the combined successive states of a running program to reflect a continuous message, which itself could be interpreted as a computer program unrelated to the host program.

Method

FIG. 7 shows a method 700 for constructing and using the probe program 102 associated with the breakpoint 106 of the base program 104, employing an abstract syntax tree (AST) and accomplishing message passing as have been described in the preceding sections of the detailed description, according to an embodiment of the invention. An AST having a number of nodes is constructed (702). Some of the nodes are used to represent the objects 204 of the base program 104 within the first address space 108, via the probe expressions 202 (704). Other of the nodes are used to represent the objects 206 of the probe program 102 within the second address space 110 (706). Thus, the end result is to seamlessly intermix the variables of the base program 104 in the first address space 108 and the variables of the probe program 102 of the second address space 110, using the AST (708).

As has been described, the first address space 108 of the objects 204 of the base program 104 and the second address space 110 of the objects 206 of the probe program 102 can be switched between by traversing the AST (710). The AST may be serialized into an interim format for storage of the AST (712), and may be deserialized from the interim format to reconstruct the AST (714). The stack 502 of the base program 104 can also be manipulated to pass messages, such as the message 504, to the user (716). More generally, the states 602A and 602B of an entity, such as the base program 104 and/or its stack 502, may be manipulated to pass messages, such as the message 604, to the user.

Advantages Over the Prior Art

Embodiments of the invention allow for advantages over the prior art. The probe program 102 is processor architecture independent, and is written in a high-level language (HLL), as the HLL probe program source code 114. The HLL compiler 112 thus constructs programs, such as the probe program 102, that are essentially dynamic insertions into existing programs, such as the base program 104, rather than constructing self-contained routines and subroutines, which are the usual end products of conventional compilers. The probe program 102 is able to reference both variables of its own definition, such as the objects 206 within the second address space 110, as well as access those variables or storage items defined within the base program 104, such as the objects 204 within the first address space 108, via the probe expressions 202. The probe program 102 is thus a generalized debugging mechanism in which automated breakpoints are inserted into software code at run-time without the need for source code modification or user intervention.

Alternative Embodiments

It will be appreciated that, although specific embodiments of the invention have been described herein for purposes of illustration, various modifications may be made without departing from the spirit and scope of the invention. For instance, whereas the stack 502 of the base program 104 or probe program has been specifically described as being manipulable to convey messages to the user, in other embodiments the states of other entities or objects may be manipulated to convey messages to the user. Furthermore, the high-level language (HLL) in which the probe program 102 is written may be the same or different than the HLL in which the base program 104 is written. Accordingly, the scope of protection of this invention is limited only by the following claims and their equivalents.

We claim:

1. A system comprising:
one or more processors;
a base program executable by the one or more processors and having one or more breakpoints;
a probe program associated with each breakpoint, the probe program executed by an interpreter, the interpreter running on the one or more processors,
the probe program generated from source code written in a high-level language, the probe program independent of an architecture of the one or more processors due to the source code of the probe program being written in the high-level language,
the high-level language of the source code from which the probe program is generated being different than a high-level language in which the base program is written,
the source code from which the probe program is generated by being compiled by a compiler specific to compiling probe programs like the probe program and not for compiling the base program,
the probe program being independent of an architecture of the one or more processors due to the probe program being initially written in the high-level language and compiled by the compiler,
the probe program being independent of a machine code representation of the base program, the machine code representation of the base program being tied to an instruction set of the one or more processors, and the probe program associated with each breakpoint being executed when the breakpoint is reached during execution of the base program; and, an abstract syntax tree (AST) having a plurality of nodes, at least some of the nodes of the AST representing objects of the base program and other of the nodes of the AST representing objects of the probe program, such that a first address space of the objects of the base program and a second address space of the objects of the probe program are switched between by traversing the AST.

* * * * *